(12) United States Patent
Ng et al.

(10) Patent No.: US 9,007,973 B2
(45) Date of Patent: Apr. 14, 2015

(54) METHODS AND SYSTEMS FOR DYNAMIC SWITCHING, UPLINK POWER CONTROL AND SYNCHRONIZATION IN WIRELESS NETWORKS

(75) Inventors: Boon Loong Ng, Richardson, TX (US); Jianzhong Zhang, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 102 days.

(21) Appl. No.: 13/586,298

(22) Filed: Aug. 15, 2012

(65) Prior Publication Data

US 2013/0044665 A1 Feb. 21, 2013

Related U.S. Application Data

(60) Provisional application No. 61/523,681, filed on Aug. 15, 2011, provisional application No. 61/538,053, filed on Sep. 22, 2011.

(51) Int. Cl.
*G08C 17/00* (2006.01)
*H04W 52/24* (2009.01)
*H04W 52/14* (2009.01)

(52) U.S. Cl.
CPC .......... *H04W 52/242* (2013.01); *H04W 52/146* (2013.01); *H04W 52/244* (2013.01)

(58) Field of Classification Search
CPC .............................. H04W 52/02; H04W 56/00
USPC ........... 370/331, 503, 252, 328, 329; 455/502
See application file for complete search history.

(56) References Cited

U.S. PATENT DOCUMENTS

| 2003/0207699 A1 | 11/2003 | Shpak |
| 2010/0238892 A1 | 9/2010 | Dahlman et al. |
| 2010/0254471 A1 | 10/2010 | Ko et al. |
| 2013/0028120 A1* | 1/2013 | Sun et al. .................. 370/252 |
| 2013/0028182 A1* | 1/2013 | Geirhofer et al. ............ 370/328 |
| 2013/0029657 A1* | 1/2013 | Gao et al. .................. 455/422.1 |
| 2013/0039199 A1* | 2/2013 | Liao et al. .................. 370/252 |
| 2013/0265981 A1* | 10/2013 | Yang et al. .................. 370/329 |

FOREIGN PATENT DOCUMENTS

| WO | WO 2010/128909 A1 | 11/2010 |
| WO | WO 2011/085191 A1 | 7/2011 |

OTHER PUBLICATIONS

International Search Report dated Feb. 28, 2013 in connection with International Patent Application No. PCT/KR2012/006533, 4 pages.
Written Opinion of the International Searching Authority dated Feb. 28, 2013 in connection with International Patent Application No. PCT/KR2012/006533, 5 pages.

(Continued)

*Primary Examiner* — Albert T Chou

(57) ABSTRACT

Dynamic switching of uplink power control and synchronization in wireless networks involves switching a user equipment (UE) from a transmission point common (TP-common) mode to a transmission point specific (TP-specific) mode in a wireless network. The UE transmits at a high power level in a TP-common mode to compensate for a larger path loss between the UE and the TPs and at a low power level in a TP-specific mode to save battery power based on a smaller path loss between the UE and a specific, nearby TP.

30 Claims, 7 Drawing Sheets

(56) References Cited

OTHER PUBLICATIONS

Partial European Search Report dated Feb. 20, 2015 in connection with European Patent Application No. 12823980.3; 7 pages.

Ohwatari, et al.; "Investigation on Improvement in Channel Estimation Accuracy Using Data Signal Muting in Downlink Coordinated Multiple-Point Transmission and Reception in LTE-Advanced"; Wireless Communictions and Networking Conference; Mar. 31, 2011 XP002735764; pp. 1288-1293.

* cited by examiner

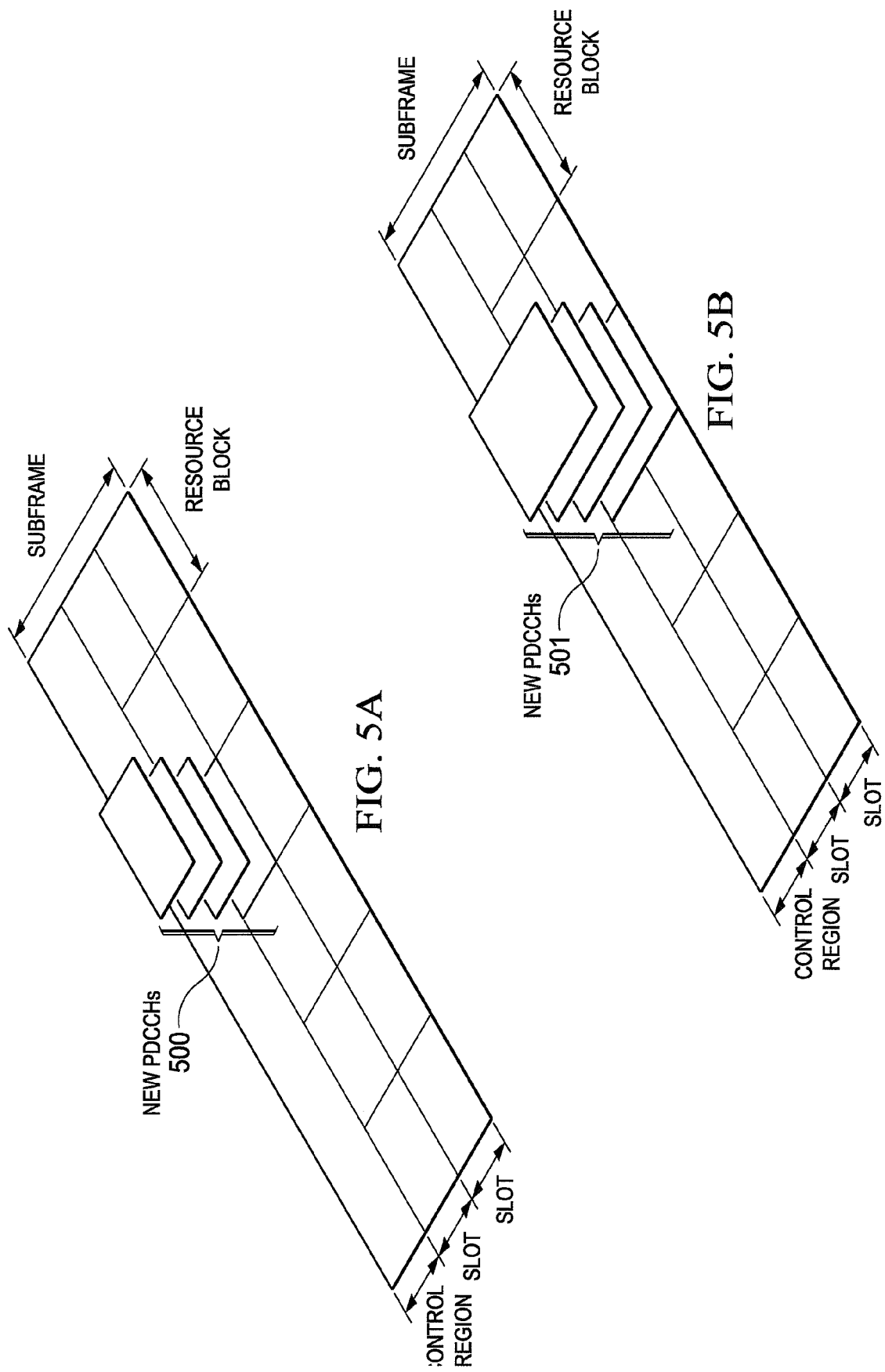

METHODS AND SYSTEMS FOR DYNAMIC SWITCHING, UPLINK POWER CONTROL AND SYNCHRONIZATION IN WIRELESS NETWORKS

CROSS-REFERENCE TO RELATED APPLICATIONS AND CLAIM OF PRIORITY

The present application claims priority to U.S. Provisional Patent Application Ser. No. 61/523,681, filed Aug. 15, 2011, entitled "UPLINK POWER CONTROL, RANDOM ACCESS CHANNEL AND PROCEDURE FOR DISTRIBUTED ANTENNA SYSTEM FOR LTE" and U.S. Provisional Patent Application Ser. No. 61/538,053, filed Sep. 22, 2011, entitled "UPLINK POWER CONTROL, RANDOM ACCESS CHANNEL AND PROCEDURE FOR DISTRIBUTED ANTENNA SYSTEM FOR LTE." The content of the above-identified patent documents is incorporated herein by reference.

TECHNICAL FIELD

The present application relates to wireless networks, and, more specifically, to methods and systems for dynamic switching, uplink power control and synchronization in wireless networks.

BACKGROUND

In long term evolution (LTE) networks, user equipment (UE) may communicate with a base station (e.g., eNodeB, also referred to as "eNB" or macro cell) and one or more distributed low power remote radio heads (RRHs). For various reasons, UEs may transmit at a transmit power above the lowest required power level necessary to maintain connectivity, which results in a waste of transmit power as well as increased network interference.

There is, therefore, a need for improved control over uplink transmit power in a wireless communications system.

SUMMARY

Various disclosed embodiments include methods and systems for dynamic switching, uplink power control and synchronization in wireless networks. According to disclosed embodiments, a method of switching transmission by a user equipment (UE) from a transmission point common (TP-common) mode to a transmission point specific (TP-specific) mode includes receiving by the UE a plurality of channel state information reference signals (CSI-RSs), each CSI-RS being associated with a respective transmit point (TP). The method includes measuring by the UE respective reference signal received power (RSRP) of the CSI-RSs and transmitting a measurement report including the measured RSRPs. The method includes receiving by the UE TP-specific configuration, wherein the TP-specific configuration identifies a specific TP. The method includes switching by the UE from the TP-common mode to the TP-specific mode in response to the TP-specific configuration by establishing uplink connectivity with the identified specific TP.

According to disclosed embodiments, a method of uplink synchronization by the UE with a specific TP includes receiving by the UE a specific TP configuration identifying the specific TP. The method includes receiving by the UE an allocation of a specific TP random access channel (specific TP RACH). The method includes transmitting by the UE over the specific TP RACH a random access preamble (RA preamble). The method includes receiving by the UE over the specific TP RACH a random access response (RAR) and synchronizing the UE's timing with the specific TP in response to the RAR.

According to disclosed embodiments, the method of uplink synchronization includes receiving by the UE an allocation of a physical downlink control channel (PDCCH) over the specific TP RACH. The method includes determining by the UE if the PDCCH was transmitted by the specific TP. The method includes transmitting by the UE over the specific TP RACH if the PDCCH was transmitted by the specific TP, and transmitting by the UE over the common TP RACH if the PDCCH was not transmitted by the specific TP.

According to disclosed embodiments, the method of uplink synchronization includes determining by the UE if the RAR was transmitted by the specific TP. The method includes transmitting by the UE a PUSCH corresponding to the RAR over the specific TP RACH if the RAR was transmitted by the specific TP, and transmitting by the UE the PUSCH corresponding to the RAR over the common TP RACH if the RAR was not transmitted by the specific TP.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A and 5B illustrate PDCCH and Enhanced PDCCH (E_PDCCH) regions within a wireless network supporting TP-common and TP-specific transmission modes according to embodiments of the present disclosure;

DETAILED DESCRIPTION

The following documents and standards descriptions are hereby incorporated into the present disclosure as if fully set forth herein:

REF1—3GPP Technical Specification No. 36.300, version 10.3.0 (2011 March);
REF2—3GPP Technical Specification No. 36.321, version 10.2.0 (2011 June);
REF3—3GPP Technical Specification No. 36.331, version 10.2.0 (2011 June);
REF4—3GPP Technical Specification No. 36.211, version 10.2.0 (2011 June);
REF5—3GPP Technical Specification No. 36.212, version 10.2.0 (2011 June);
REF6—3GPP Technical Specification No. 36.213, version 10.2.0 (2011 June);
REF7—3GPP Document No. RP-101425; and
REF8—3GPP Technical Specification No. 36.304, version 10.2.0 (2011 June).

FIGS. 1-8, discussed below, and the various embodiments used to describe the principles of the present disclosure in this patent document are by way of illustration only and should not be construed in any way to limit the scope of the disclosure. Those skilled in the art will recognize that the principles of the present disclosure may be implemented in any suitably arranged device or system. The numerous innovative teachings of the present disclosure will be described with reference to exemplary non-limiting embodiments.

One of deployment scenarios considered in the Study Item (SI) for Coordinated Multi-Point Operation (CoMP) for Long Term Evolution (LTE)-Advance, referred to herein as "CoMP Scenario 4," is defined as a network with low power RRHs within the macrocell coverage, where the transmission/reception points created by the RRHs have the same cell IDs (CIDs) as the macro cell. In this deployment scenario, it is generally assumed that the same cell-specific reference signals (CRSs) are transmitted by all Transmission Points (TP), although each TP transmits its own CSI-RS (TP-specific CSI-RS). For downlink (DL) data transmission, it is envisioned that a UE shall receive the downlink data from the TP or set of the TP(s) having the best downlink signal quality at the UE. Exploiting spatial isolation of the TPs, it is possible to allow reuse of downlink resources in TPs that are sufficiently isolated from one another to obtain sub-cell splitting gain.

A similar technique can also be used in the uplink (UL). In this case, depending on the UE location in the cell, the UE may transmit to the TP or set of TP(s) having the best uplink signal quality at the respective TPs. Exploiting spatial isolation of the TPs, it is possible to allow reuse of uplink resources in TPs that are sufficiently isolated from one another to obtain sub-cell splitting gain.

Figure 1:
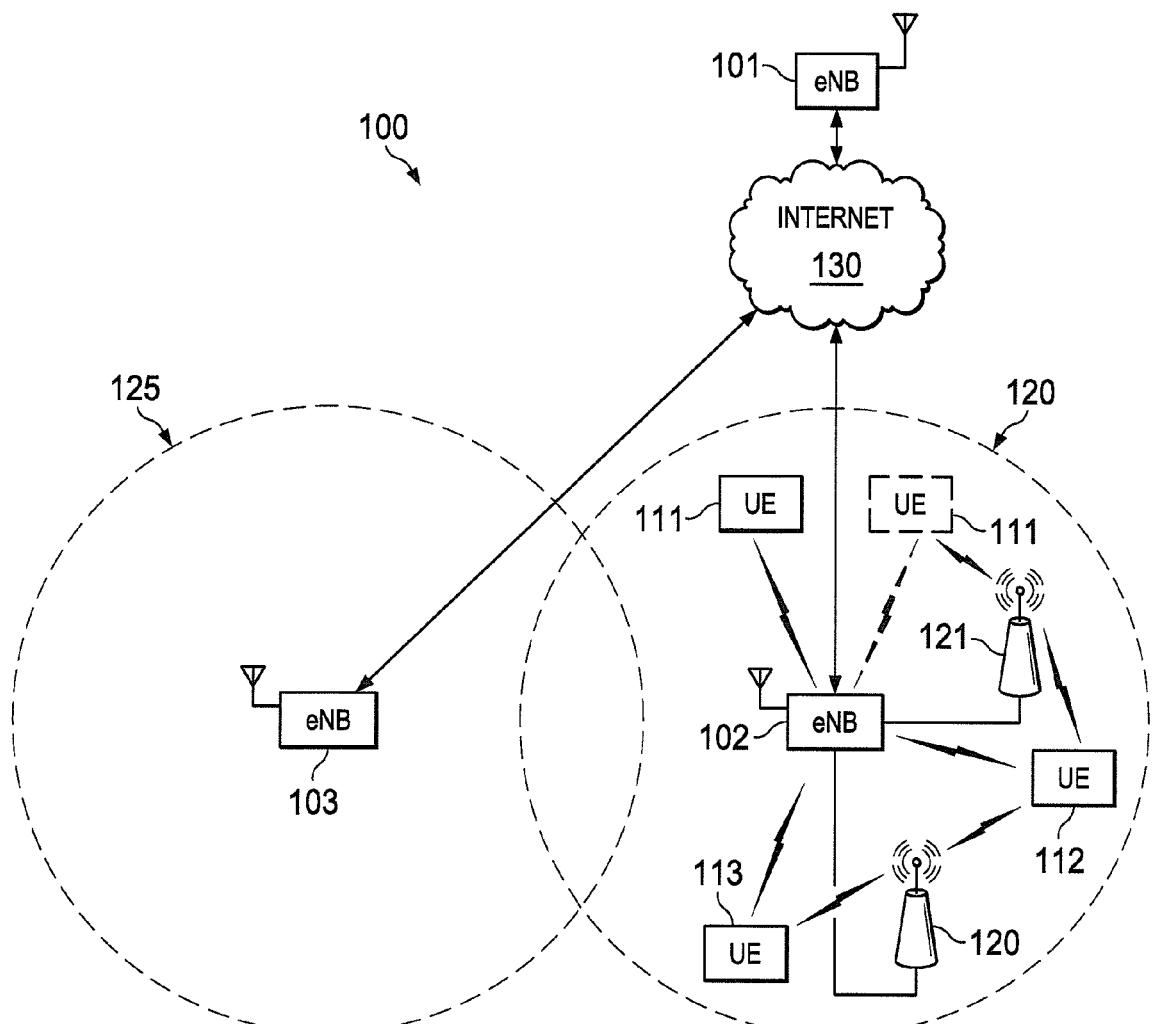
FIG. 1 is a high level block diagram illustrating an exemplary wireless network implementing dynamic switching uplink power control and synchronization according to one or more embodiments of the present disclosure.

FIG. 1 is a high level block diagram illustrating an exemplary wireless network implementing dynamic switching uplink power control and synchronization according to one or more embodiments of the present disclosure. The wireless network 100 illustrated in FIG. 1 is provided solely for purposes of explaining the subject matter of the present disclosure, and is not intended to suggest any limitation regarding the applicability of that subject matter. Other wireless networks may employ the subject matter depicted in the drawings and described herein without departing from the scope of the present disclosure. In addition, those skilled in the art will recognize that the complete structure and operation of a wireless network and the components thereof are depicted in the drawings and described therein. Instead, for simplicity and clarity, only so much of the structure and operation of the wireless network and the components thereof as are unique to the present disclosure or necessary for an understanding of the present disclosure are depicted and described.

In the illustrated embodiment, wireless network 100 includes an Evolved Node B ("eNodeB" or "eNB") 101, eNB 102, and eNB 103. Depending on the network type, other well-known terms may be used instead of "eNB," such as "base station" or "access point." For simplicity and clarity, the term "eNB" will be used herein to refer to the network infrastructure components that provide wireless access to remote (mobile or fixed) terminals, for voice communications, data communications, or both.

The eNB 101 communicates with eNB 102 and eNB 103 via network 130 operating according to a standardized protocol (e.g., X2 protocol), via a proprietary protocol, or preferably via Internet protocol (IP). IP network 130 may include any IP-based network or a combination thereof, such as the Internet, a proprietary IP network, or another data network.

The eNB 102 provides wireless broadband access to a first plurality of user equipments (UEs) within coverage area 120 of eNB 102. The first plurality of UEs includes UE 111, which may be a mobile terminal such as a cell phone, a wireless laptop, a wireless-enabled tablet, or the like; UE 112, which may be a fixed wireless access device located in an enterprise (e.g., a small business), in a first residence or in a second residence; and UE 113. For simplicity and clarity, the term "user equipment" or "UE" is used herein to designate any remote wireless equipment that wirelessly accesses an eNB, whether the UE is a mobile device (e.g., cell phone, wireless-enabled tablet or laptop, etc.) or is normally considered a stationary device (e.g., desktop personal computer, wireless television receiver, etc.). In other systems, other well-known terms may be used instead of "user equipment," such as "mobile station (MS)," "subscriber station (SS)," "remote terminal (RT)," "wireless terminal (WT)," and the like.

In an exemplary embodiment, eNBs 101-103 may communicate with each other and/or with one or more of UEs 111-113 using Long Term Evolution (LTE) or LTE-A wireless communication techniques. While only three UEs are depicted in FIG. 1, it will be understood that wireless network 100 may provide wireless broadband access to additional UEs.

Network 100 also in includes remote radio heads (RRHs) 120 and 121 coupled to eNB 102 and operating coordinately with eNB 102 with respect to wireless transmissions to and from UEs 111, 112 and 113. The eNB, RRH and other network nodes are also referred to as transmission points (TPs). In operation, a UE 112 may be located with sufficient proximity and/or transmit uplink signals with sufficient signal strength to enable a plurality of TPs (e.g., eNB 102 and RRHs 120 and 121) to all receive and decode the signals. Likewise, UE 113 may be located with sufficient proximity and/or transmit uplink signals with sufficient strength to enable eNB 102 and RRH 120 to both receive and decode the signals. A mobile UE 111 may move toward or away from a TP, such as RRH 121.

FIG. 1 thus illustrates the above-described CoMP Scenario 4. If a UE 111 is (at least initially) spatially far away from any of the RRHs 120 and 121, then the UE 111 uses the so-called TP-common transmission to connect to the Macro-eNB 102 as well as the other (RRH) TPs 120 and 121 in the cell (where the link between UE 111 and RRHs 120, 121 is not depicted in FIG. 1). Meanwhile, if a UE 112, 113 is spatially close to one or a few of the RRHs 120, 121 within the cell, then the respective UE uses so-called TP-specific transmission to communicate with a subset of the TPs in that cell of the network. (As used herein, "TP-specific" encompasses transmission modes including communications between a UE and a subset of TPs within a cell, as well as transmission modes involving communications between the UE and only a single TP in the cell). The TP-common uplink transmissions are received by both the Macro eNB 102 and the RRHs 120, 121, whereas TP(s)-specific uplink transmissions are received only by nearby TP(s) only (eNB 102 and RRHs 120, 121 for UE 112 in FIG. 1, eNB 102 and RRH 120 only for UE 113 in FIG. 1).

For either or both of the DL and/or the UL, two methods are possible for selecting TP(s) for TP(s)-specific transmission: TP(s) selection/association based on UL measurement, e.g. on Sounding Reference Signal (SRS), Physical Uplink Control CHannel (PUCCH), or physical Uplink Shared CHannel (PUSCH) transmissions. The TPs listen to a UE's UL signals and the network determines each UE's TP(s) for TP-specific transmission based on the UL measurement results from the TPs. Alternatively, TP selection/association may be based on Channel State Information Reference Signal (CSI-RS) measurement by the UE. The UE measures the CSI-RS from each TP and reports the measurements, such as by Reference Signal Received Power (RSRP) information. The network decides each UE's TP(s) for TP-specific transmission based on the UE's measurement reports. The TP selection/association problem for each UE can also be seen as the CSI-RS(s) selection/association problem. In this disclosure, TP selection by either of the above-described techniques is assumed to be supported.

In a CoMP transmission, TPs such as RRHs and eNBs typically transmit the same cell-specific reference signals (CRS), but each TP transmits a unique CSI-RS. Referring to FIG. 1, eNB 102, UEs 111, 112 and 113, and RRHs 120 and 121 may communicate in a so-called TP-common transmission mode by using CRSs. In particular, in a TP-common transmission mode, the TPs each transmit a CRS, which are (currently exclusively) utilized by the UEs to estimate a path loss (PL) and a channel quality. The UEs determine the initial uplink transmit power based on the PL estimate and transmit uplink signals according to the determined uplink transmit power, and in response the TPs may send a power control signal to the UEs to enable the UEs to transmit uplink signals with sufficient power so that the TPs will receive and accurately decode the uplink signals.

Figure 2:
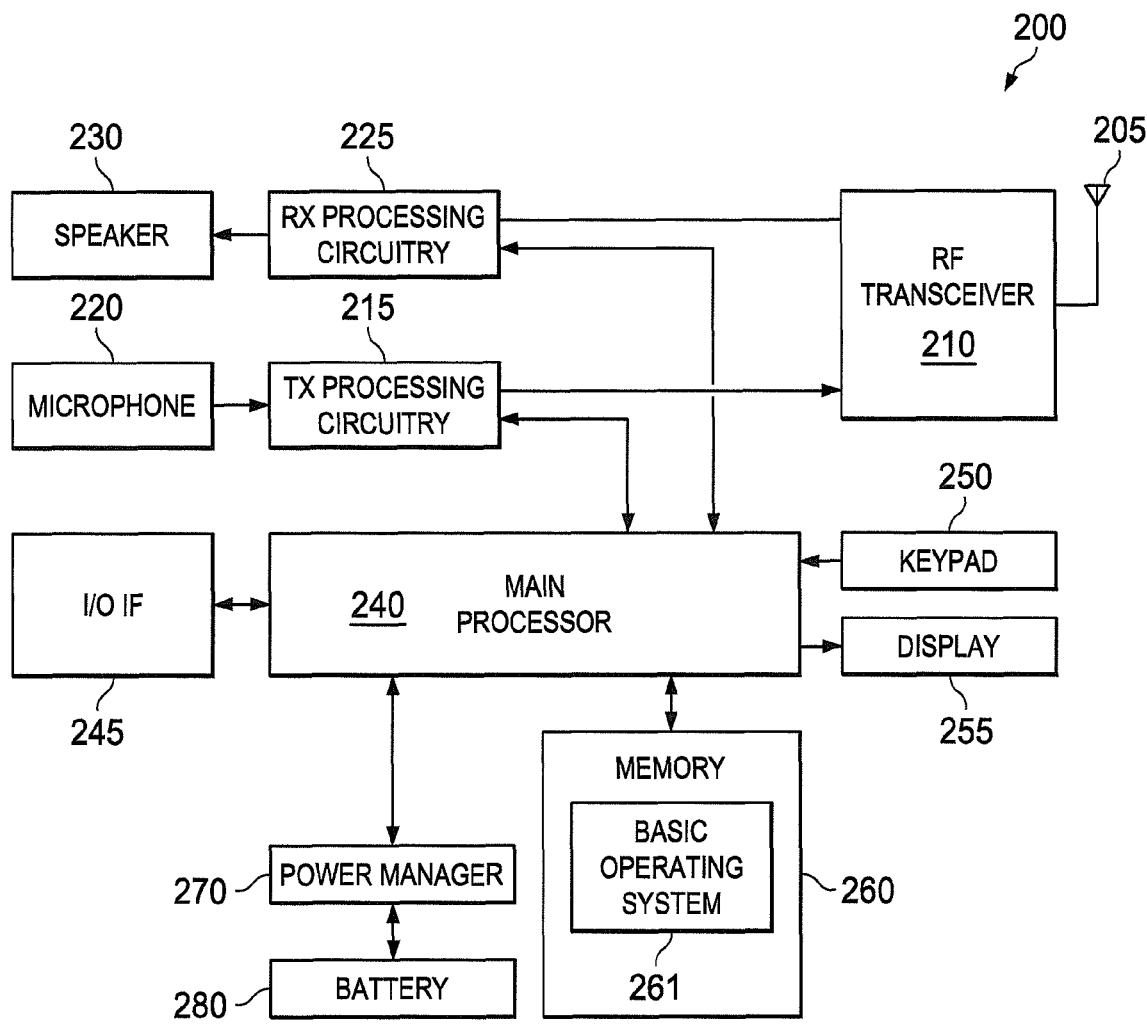
FIG. 2 illustrates user equipment implementing dynamic switching uplink power control and synchronization according to one or more embodiments of the present disclosure.

FIG. 2 illustrates user equipment implementing dynamic switching uplink power control and synchronization according to one or more embodiments of the present disclosure. UE 200 may represent any of the UEs 111-113 shown in FIG. 1. The particular structure of UE 200 illustrated in FIG. 2 is for illustration purposes only; other embodiments of UE 200 may be used to implement the subject matter of the present disclosure without departing from the scope of the disclosure.

In the exemplary embodiment of FIG. 2, UE 200 comprises antenna 205, radio frequency (RF) transceiver 210, transmit (TX) processing circuitry 215, microphone 220, and receive (RX) processing circuitry 225. UE 200 also comprises speaker 230, main processor 240, input/output (I/O) interface (IF) 245, keypad 250, display 255, memory 260, power manager 270, and battery 280.

Radio frequency (RF) transceiver 210 receives from antenna 205 an incoming RF signal transmitted by an eNB 101, 102 or 103 of wireless network 100 in FIG. 1. Radio frequency (RF) transceiver 210 down-converts the incoming RF signal to produce an intermediate frequency (IF) or a baseband signal. The IF or baseband signal is sent to receiver (RX) processing circuitry 225 that produces a processed baseband signal by filtering, decoding, and/or digitizing the baseband or IF signal. Receiver processing circuitry 225 transmits the processed baseband signal to speaker 230 (i.e., voice data) or to main processor 240 for further processing (e.g., to execute functions in connection with web browsing).

Transmitter (TX) processing circuitry 215 receives analog or digital voice data from microphone 220 or other outgoing baseband data (e.g., web data, e-mail, interactive video game data) from main processor 240. Transmitter processing circuitry 215 encodes, multiplexes, and/or digitizes the outgoing baseband data to produce a processed baseband or IF signal. Radio frequency (RF) transceiver 210 receives the outgoing processed baseband or IF signal from transmitter processing circuitry 215. Radio frequency (RF) transceiver 210 up-converts the baseband or IF signal to a radio frequency (RF) signal that is transmitted via antenna 205.

In some embodiments of the present disclosure, main processor 240 is a microprocessor or microcontroller. Memory 260 is coupled to main processor 240. Memory 260 can be any computer readable medium. For example, memory 260 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. According to such embodiments, part of memory 260 comprises a random access memory (RAM) and another part of memory 260 comprises a Flash memory, which acts as a read-only memory (ROM).

Main processor 240 executes basic operating system (OS) program 261 stored in memory 260 in order to control the overall operation of mobile station 200. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is also coupled to keypad 250 and display unit 255. The operator of UE 200 uses keypad 250 to enter data into UE 200. Display 255 may be a liquid crystal or light emitting diode (LED) display capable of rendering text and/or graphics from web sites. Alternate embodiments may use other types of displays.

Main processor 240 is capable of executing other processes and programs resident in memory 260. Main processor 240 can move data into or out of memory 260, as required by an executing process. Main processor 240 is also coupled to power manager 270, which is further coupled to battery 280. Main processor 240 and/or 270 power manager may include software, hardware, and/or firmware capable of controlling and reducing power usage and extending the time between charges of battery 280. In certain embodiments, power manager 270 may be separate from main processor 240. In other embodiments, power manager 270 may be integrated in, or otherwise a part of, main processor 240. Power manager 270 is connected to and controls other components within UE 200, beyond the connections depicted in FIG. 2. Power manager 270, together with and/or based on information from main processor 240, implements transmission mode selection or dynamic switching for uplink power control and synchronization according to the present disclosure as discussed in further detail below.

PL Estimation

Since a set of CRSs is uniquely defined for a specific cell, a CRS-based PL estimate may be considered acceptable where TPs in a cell are centralized and have uniform transmission power and other capabilities. However, in a non-uniform system that includes (referring once again to FIG. 1) both an eNB 102 and distributed RRHs 120, 121 in the coverage of a single cell CID, a CRS-based PL estimate—assuming the CRS is transmitted by all TPs in a Single Frequency Network (SFN) fashion—represents an "average" estimate of the channel quality for the multiple connections between the UE and the various TPs. Since a CRS-based PL estimate does not accurately represent the physical channel quality for specific connections between the UE and any individual TP, the UEs are unable to provide an accurate estimate of the channel quality between the UEs and the individual TPs.

For computation of CRS-based PL estimates and TP-specific PL estimates (also referred to as CSI-RS based PL estimates or E-PL), several different situations may arise. For purposes of explaining those different scenarios, eNB 102 may be taken as transmitting at 43 decibels relative to one milliWatt (mW) of power (that is, dBm) and RRH 120 as transmitting at 23 dBm, with both eNB 102 and RRH 120 transmitting with a CID=1.

CRS-Based PL Estimate Between eNB and UE (RRH(s) Turned Off)

Consider, for example, a scenario wherein eNB 102 transmits a downlink signal and RRHs 120 and 121 are turned off. If the RSRP of the downlink signal is −80 dBm, the estimated CRS-based PL between eNB 102 and UE 112 is 123 dB.

CRS-Based PL Estimate Between eNB and UE in SFN (RRH Turned on)

Next, consider, a single frequency network (SFN) scenario wherein both eNB 102 and RRH 120 transmit downlink signals. If the RSRP of the downlink signal received is −65 dBm, the estimated CRS-based PL between eNB 102 and UE 112 is 108 dB.

CSI-RS-Based PL Estimate Between RRH and UE (eNB Turned Off)

Next, consider a TP-specific transmission mode wherein a UE 112 transmits uplink signals to a specific TP (i.e., targeted TP). As discussed before, TPs each transmit a unique CSI-RS, which is received by the UE and utilized to determine the RSRP of a downlink signal. Consider, for example, that RRH 120 transmits a unique CSI-RS, which is then used by UE 112 to determine the RSRP of the downlink signal. If the RSRP of the downlink signal is −67 dBm, the estimated PL between RRH 120 and UE 112 is 90 dB.

It is evident from the above calculations that the CRS PL estimate represents roughly an 18 dB overestimate of the actual PL the UE 112 experiences with the nearby RRH. In another words, for TP-specific transmissions that targets this particular nearby RRH 120, using existing power control methods and that PL estimate will result in the UE 112 transmitting at 18 dB above necessary to reach RRH 120, and as a result waste of UE power and increase of network interference. It is further observed that this overestimate is mostly due to the improper assumption of reference power with CRS, which can be set at only one single value for a cell. The present disclosure thus proposes to find an uplink power control mechanism that can help the UE save battery power whenever possible, while in the meantime ensuring good connectivity for the UE in both TP-common and TP-specific transmissions.

Various disclosed embodiments of the present disclosure are directed to methods and systems for selecting between and/or switching from a TP-common transmission mode to a TP-specific transmission mode, or vice versa, in a wireless network. Also, the disclosed embodiments are directed to methods and systems for uplink synchronization in a wireless network.

As discussed before, the CRS-based PL estimate causes a UE to transmit more power than necessary to maintain connectivity with an RRH, which results in a waste of transmit power as well as increased network interference. According to disclosed embodiments, a CSI-RS based PL between the UE and one or more specific (i.e., targeted) TPs is determined. The CSI-RS based PLs are then used to select a specific TP. Thereafter, the UE transmits uplink signals to the selected TP (also referred to as the "specific or targeted TP") and receives downlink signals from the specific TP. Since the CSI-RS based PL provides a more accurate estimate of the PL between the specific TP and the UE, the UE may lower the transmit power to a level adequate for the specific TP to receive and decode the uplink signals. Thus, the CSI-RS based PL estimate allows the UE to transmit uplink signals at a lower power level while maintaining connectivity with the specific TP, thereby saving battery power and reducing interference.

According to disclosed embodiments, if a UE is far from the RRHs in a cell (as UE 111 is, at least initially), the UE operates in a TP-common transmission mode to connect to an eNB (or macro cell) as well as other RRHs to communicate with the network. If, on the other hand, the UE is or moves close to an RRH (as UE 111 becomes, and UE 112 and 113 are), then the UE operates in a TP-specific transmission mode to connect with the specific TP to communicate with the network. In the exemplary embodiment of FIG. 1, UE 113 is far away from eNB 102 and (initially) RRHs 120 and 121. Accordingly, UE 113 operates in a TP-common transmission mode to connect to eNB 102 as well as RRH 120. On the other hand, since UE 112 is close to RRHs 120 and 121, UE 112 operates in a TP-specific transmission mode to connect to one or both of RRHs 120 and 121.

In some embodiments, UEs measure CSI-RS and report measurements such as RSRP to TPs. Based on the measurement reports from the UEs, the network determines a transmission mode (TP-common or TP-specific) for each UE and each UE's TP for TP-specific transmission. In other embodiments, TPs may measure UEs' UL signals (e.g., sounding reference signal (SRS), physical uplink control channel (PUCCH), and/or physical uplink shared channel (PUSCH)).

Based on the UL measurements at the TPs, the network determines each UE's transmission mode (TP-common or TP-specific) and each UE's TP for TP-specific transmission according to the UL measurement results.

Uplink Power Control for Distributed Antenna Systems

To achieve a balance between the need to conserve UE battery power and the need to reduce network interference while maintaining continuous connectivity, the uplink power control mechanism for a network with distributed RRHs is designed in a way such that:

For TP-common transmissions, the UE transmits at relatively high power to compensate for a larger PL between the UE and the TP(s); and For TP-specific transmissions, the UE transmits at a relatively low power so that the UE can save battery power while maintaining connectivity with one of the nearby RRHs.

In order to achieve that balance, several aspects of the system design need to be enhanced including: PL estimation, to include CSI-RS based pathloss estimation as well as reference power setting at each TP; the UL power control equations employed with CSI-RS based pathloss estimation; and when/how to select and/or switch between use of the CRS-based PL estimate and the CSI-RS based PL estimate.

CSI-RS Based PL

The PL overestimate problem described above may be addressed in the following manner: A PL estimate from a UE to a plurality K of TPs, $E\_PL(k)$, where $k=1, \ldots, K$, may be obtained using the CSI-RS associated with each TP. For the kth TP, an additional PL estimate (that is, in addition to the CRS PL) may be obtained using the associated CSI-RS, denoted $E\_PL(k)$. For the kth TP, the reference transmission power of the associated CSI-RS is then included in the broadcast message (csi-referenceSignalPower). $E\_PL(k)$ can be derived as:

$E\_PL(k)$=csi-referenceSignalPower of the kth
TP–higher layer filtered RSRP based on CSI-RS
of the kth TP (E-RSRP(k))

This will ensure that we have an accurate estimate of the PL from the UE to each of the neighboring TPs. A reference transmission power of the associated CSI-RS (csi-referenceSignalPower), which is required for the computation, is typically included in a broadcast message.

Uplink Power Control

For TP-common transmissions, a TP-common power level may be derived using a CRS-based PL estimate:

$$P_{PUSCH,c}(i) = \min\left\{\begin{array}{l} P_{CMAX,c}(i), \\ 10\log_{10}(M_{PUSCH,c}(i)) + P_{0\_PUSCH,c}(j) + \alpha_c(j) \cdot PL_c + \\ \Delta_{TF,c}(i) + f_c(i) \end{array}\right\} \quad (1)$$

where $P_{PUSCH,c}(i)$ is the TP-common power level for PUSCH transmission in subframe i for the serving cell c, $P_{CMAX,c}(i)$ is a maximum transmission power possible for the UE, $M_{PUSCH,c}(i)$ is the bandwidth of the PUSCH resource assignment expressed in number of resource blocks valid for subframe i and serving cell c, $P_{0\_PUSCH,c}(j)$ is a parameter based on components provided from higher layers, $PL_c$ is the downlink pathloss estimate calculated in the UE for serving cell c, the fast fading component $f_c(i)$ is one of two defined values depending on whether accumulation is enabled for serving cell c, and $\alpha_c(j)$ and $\Delta_{TF,c}(i)$ have the definitions found for those terms in [REF6]. For TP-specific transmission, a TP-specific power level may be derived by replacing the path loss parameter $PL_c$ by $PL_{c,E}$:

$$P_{PUSCH,c,E}(i) = \min\left\{\begin{array}{l} P_{CMAX,c}(i), \\ 10\log_{10}(M_{PUSCH,c}(i)) + P_{0\_PUSCH,c}(j) + \alpha_c(j) \cdot PL_{c,E} + \\ \Delta_{TF,c}(i) + f_c(i) \end{array}\right\} \quad (2)$$

where $P_{PUSCH,c,E}(i)$ is the TP-specific power level for PUSCH transmission in subframe i for a particular (set of) TP(s) E in the serving cell c, and $PL_{c,E}$ is the downlink pathloss estimate calculated in the UE for a particular (set of) TP(s) E in serving cell c. It will be appreciated that if the UE measures PL from only one RRH (i.e., E has only one TP), then $PL_{c,E}$ is simply $E\_PL$. On the other hand, if the UE measures PL from a plurality of RRHs (and/or one or more RRHs and the eNB) and has more than one $E\_PL(k)$, a protocol is needed for the UE to choose among the available $E\_PL(k)$, $k=1, \ldots, K$. In such situations, $PL_{c,E}$ may be obtained by one of the following alternatives:

Path Loss=Minimum of all $E\_PL(k)$, $k=1, \ldots, K$ (i.e., the smallest path loss estimate);

Path Loss=$E\_PL$ (0), the "primary" TP (may be defined as the central TP or the preferred TP);

Path Loss=$E\_PL(k)$, where k is configured by a higher layer (e.g. Radio Resource Control (RRC)); and Path Loss selection is configurable among all or a subset of the alternative above.

Similar enhancement can be performed to the uplink power control equation for PUSCH with simultaneous PUCCH, for PUCCH and for SRS, as well as for the power headroom equation.

According to an exemplary embodiment, a switch between the TP-common transmission and TP-specific transmission may be initiated with an instruction from an eNB (or macro cell) to the UE by higher layer signaling (e.g., radio resource control (RRC)).

Figure 3A:
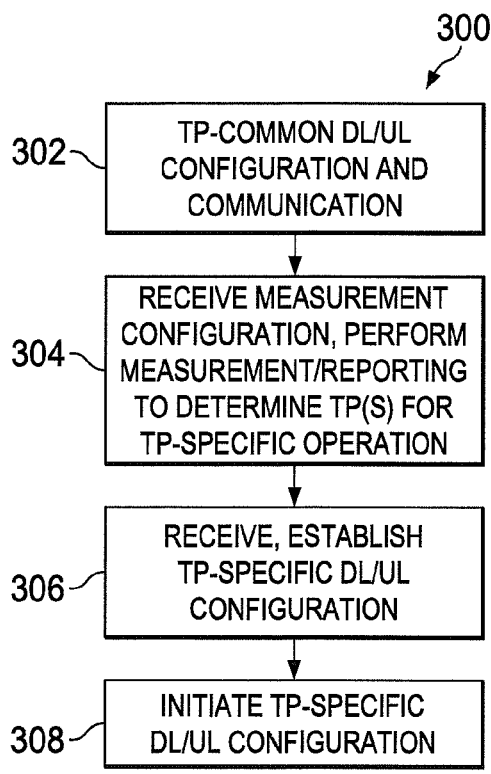
FIG. 3A is a high level flow chart for a process of selecting and/or switching between a TP-common transmission mode to a TP-specific transmission mode in a wireless network according to embodiments of the present disclosure.
Figure 4:
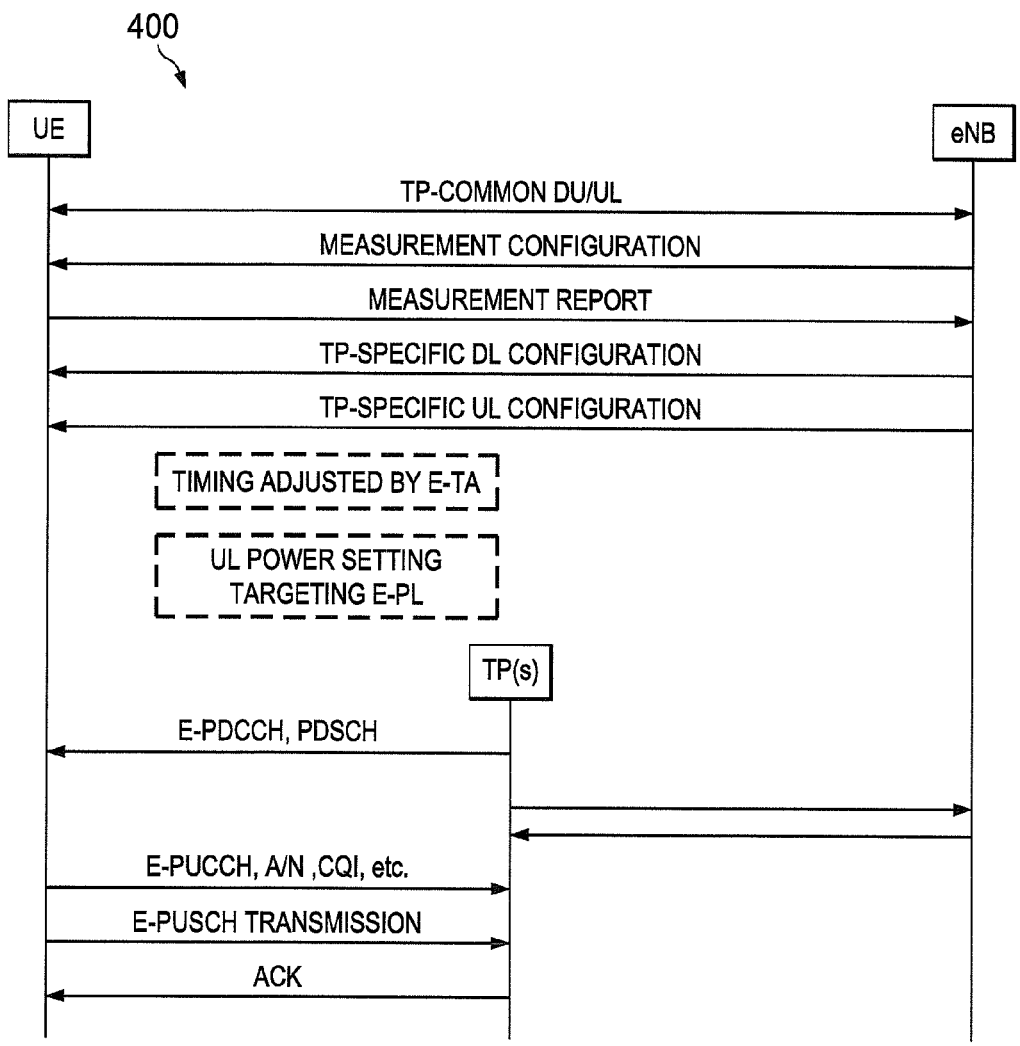
FIG. 4 is a diagram illustrating messages exchanged by a UE, an eNB, and a TP (e.g., an RRH) during overall operation and configuration of the UE to select or switch between TP-common and TP-specific transmission modes in a wireless network according to embodiments of the present disclosure.

FIG. 3A is a high level flow chart for a process of selecting and/or switching between a TP-common transmission mode and a TP-specific transmission mode in a wireless network according to embodiments of the present disclosure. The process 300 is performed in a UE, such as UE 112 in FIG. 1, and will be described in conjunction or as part of with the message flow 400 depicted in FIG. 4. FIG. 4 is a diagram illustrating messages exchanged by a UE, an eNB, and a TP (e.g., an RRH) during overall operation and configuration of the UE to select or switch between TP-common and TP-specific transmission modes in a wireless network according to embodiments of the present disclosure. The flow diagram of the UE operation takes into account the switching between the TP-common transmission mode and TP-specific transmission mode. The switching may be in response to instructions from the eNB to the UE originating from higher layer signaling (e.g., RRC). TP(s) selection/association is assumed to be based on CSI-RS measurement by the UE (method 2 described above).

Initially, the UE exchanges messages with the eNB (or macro cell) in the TP-common transmission mode (block 302). The UE employs UL Power Control (PC) and Timing Advance (TA) techniques from the existing LTE Rel. 10 standard, together with the PUSCH, PUCCH, etc. defined in that standard.

The UE then receives measurement configuration information from the eNB identifying the sets of CSI-RSs to be monitored (i.e., a neighbor list) and performs the measurement and reporting to determine the TP(s) that will be used for TP-specific operation (block 304). For a mobile UE, measurement configuration information may be received periodically, and the subsequent steps described below likewise performed periodically, to switch between TP-common and TP-specific transmission modes or to change the TP(s) and associated parameters (UL PC, etc.) for TP-specific transmission mode. The UE performs channel and/or path loss measurement and reporting to facilitate determination of the TP(s) for TP-specific operation. Measurement is based on the CSI-RS associated with each TP (method 2 described above). The measurement report includes RSRP based on CSI-RS and the identification of the associated TP(s) (e.g., the CSI-RS configuration identifier for the respective TPs). Measurement and reporting is not necessary if the network can determine the TP(s) that would serve best in TP-specific operation for a given UE based on UL measurement (i.e., method 1 described above).

The UE then receives TP-specific DL/UL configuration information from the eNB (block 306). The information received includes: configuration of TP-specific resources for TP-specific transmission mode communications between the UE and the designated TP(s); the CSI-RS configuration for a TP or a set of TP(s) (i.e., a COMP set) and the respective CSI-RS reference signal power(s); the configuration of a TP-specific UL PC (E-PC); the configuration of Enhanced PDCCH (E-PDCCH) resources; optionally the configuration of TP-specific RACH; optionally the configuration of a TP-specific TA (E-TA); and the configuration of TP-specific PUCCH resources (E-PUCCH), as well as possibly additional information.

The UE also establishes the TP-specific UL transmission configuration, which involves: measurement of TP-specific path loss (E-PL); calculation of TP-specific UL PC based on the E-PL; optional determination of the TP-specific TA (E-TA) and configuration of a TP-specific Random Access CHannel (RACH) (alternatively, the TP-common TA and TP-common RACH may be used), as described in greater detail below; establishment of a TP-specific PUCCH (E-PUCCH), a TP-specific PUSCH (E-PUSCH), that is, the PUSCH with TP-specific UL PC and optionally E-TA, and a TP-specific PDCCH (E-PDCCH). The UE then initiates TP-specific transmission mode operation (block 308).

In one alternative embodiment, when TP-specific operation is enabled for a UE, TP-common operation is still maintained for the UE. In that situation, dynamic switching between TP-common and TP-specific operation (e.g. on subframe basis) is possible. In that alternative, in lieu of initiating TP-specific operation as depicted in block 308 of FIG. 3, the UE instead initiates either TP-specific DL/UL operation or TP-common DL/UL operation. After calculation of E-PL for each of the TP(s), the UE monitors TP-specific PDCCH (E-PDCCH) and TP-common PDCCH. If the condition(s) for TP-specific DL/UL operation are met, at least the TP-specific UL PC is set based on E-PL, together with, optionally, a TP-specific TA (E-TA) and TP-specific RACH (the TP-common TA and TP-common RACH may alternatively be used), and TP-specific PUCCH (E-PUCCH) and TP-specific PUSCH (PUSCH with TP-specific UL PC and optionally E-TA) are employed. If the condition(s) for TP-common DL/UL operation are met (which presumably means that condition(s) for TP-specific operation are not met), the UE assumes TP-common operation, including use of techniques defined by the existing standard for power control (PC), timing advance (TA), PDSCH, PUSCH, PUCCH, etc.

Figure 3B:
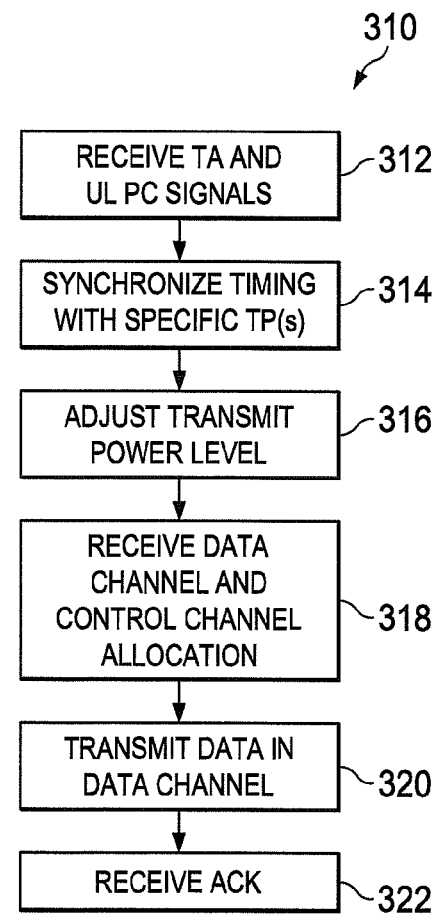
FIG. 3B is a high level flow chart for a process of operating in the TP-specific transmission mode in a wireless network according to embodiments of the present disclosure.

FIG. 3B is a high level flow chart for a process of operating in the TP-specific transmission mode in a wireless network according to embodiments of the present disclosure. The steps depicted in the flow chart are not necessarily executed in any particular order, and one or more steps may be executed concurrently. The process 310 is executed within a UE operating in TP-specific transmission mode. According to embodiments of the present disclosure, the eNB determines the specific TP mode configuration based on the measured RSRPs, PL and channel quality. As discussed above, the UE receives the TP-specific configuration and, in response, establishes communication with the identified specific TP(s). The identified specific TP(s) may be, for example, a single low-powered RRH or multiple TPs for the cell (possibly including the eNB). The UE receives timing advance (TA) and uplink power control (UL PC) signal(s) from the identified specific TPs (block 312). According to embodiments of the present disclosure, the UE receives a TP-specific power control signal comprising a TP-specific power level. Alternatively, the US may receive information allowing computation in the UE of the appropriate power level according to one of the equations given above.

Responsive to the TA signal, the UE synchronizes timing with the identified specific TP(s) (block 314). Those skilled in the art will appreciate that timing synchronization enables the UE to exchange data and control signals with the TP(s). The UE then adjusts the transmit power level from a TP-common power level to a TP-specific power level based on the received uplink power control signal (block 316). Generally, the TP-common power level is relatively higher than the TP-specific power level, because the UE transmits at a relatively high power level in the TP-common mode to compensate for a larger path loss between the UE and the TPs within the cell. In contrast, the UE transmits at a relatively low power level in the TP-specific mode due to a lower path loss between the UE and specific (usually nearby) TP(s). Those skilled in the art will appreciate that, in the TP-specific transmission mode, the UE transmits to a targeted TP (i.e., identified specific TP(s)) as opposed to all of the TPs within the cell, which allows the UE to transmit at a lower power level and yet maintain connectivity with the targeted TP(s).

Still referring to FIG. 3B, the UE receives an allocation of a data channel and a control channel from the identified specific TP (block 318). By way of example, the UE may receive a Physical Downlink Control CHannel (PDCCH), an Enhanced PDCCH, and a Physical Downlink Shared CHannel (PDSCH) from the identified specific TP(s) (block 318). In the example illustrates, the UE subsequently transmits data in the shared channel (block 320) if a UL grant was received previously, which in some instances will include transmitting on the PUSCH to the identified specific TP(s). In response to the transmission, the specific TP(s) may send ahybrid-ARQ acknowledgement (HARQ-ACK) message (block 322).

Handling of Power Control Command from PDCCH and E-PDCCH

FIGS. 5A and 5B illustrate multiplexing of PDCCHs between UEs and TP(s) within a cell in the space domain within a wireless network supporting TP-common and TP-specific transmission modes according to embodiments of the present disclosure. It is possible that a UE can receive PDCCH control messages and grants from not only the control region (that is, the first few Orthogonal Frequency Division Multiplexing or "OFDM" symbols of a subframe), but also from the data region of the subframe (that is, the other OFDM symbols in the subframe). The control message and grants received from the data region are termed an Enhanced-PDCCH (E-PDCCH) in this document. A few examples of E-PDCCHs are shown in FIGS. 5A and 5B. In both examples, spatial multiplexing (Space Division Multiple Access or "SDMA") is used in the E-PDCCH region so that multiple E-PDCCHs are multiplexed into the same time/frequency resource block (RB). In the example shown in FIG. 5A, only the OFDM symbols in a single time-frequency resource block of a single slot (the first slot after the control region) are used in a spatially multiplexed manner (illustrated by the "stack") for E-PDCCHs 500, whereas in the example shown in FIG. 5B, time-frequency resource blocks multiple slots are used for E-PDCCHs 501, overlaid with the PDSCH at the bottom of the "stack" in the same time-frequency resource blocks.

Concurrent Computation of Different PCs

Since a UE can be configured to receive both PDCCH and E-PDCCH, and therefore commands carried in format 3/3A of the LTE specification, UL/DL grants can be coming from both PDCCH and E-PDCCH. In this case, the UE simultaneously maintains computations of both the UL PC equation (equation 1 above) and the new UL PC equation (equation 2 above).

Meanwhile, the accumulation of the fast-fading component $f_c(i)$ in each of the above equations is dependent on whether the PC command is from a PDCCH or E-PDCCH grant. In particular, if a PC command is carried in either a format 3/3A message or an UL/DL grant decoded from the PDCCH region, then that PC command is used to update the $f_c(i)$ in the UL PC according to equation 1 above; on the other hand, if a PC command is carried in either a format 3/3A message or an UL/DL grant decoded from the E-PDCCH region, then that PC command is used to update the $f_c(i)$ in the UL PC according to equation 2 above.

The UE thus monitors PDCCH and E-PDCCH simultaneously to facilitate dynamic switching of TP-common and TP-specific UL transmission. The UE sets the transmission power according to the UL PC according to equation 1 above if the PC command comes from PDCCH, but sets the transmission power according to the UL PC according to equation 2 if the PC command comes from E-PDCCH.

TP-Specific RACH

Uplink transmission timing needs to be synchronized before the UE is allowed to transmit control/data information on PUCCH and PUSCH in the uplink. Typically, the uplink timing adjustment for a UE is different for different reception points that are not co-located. In LTE Rel-8/9/10, uplink transmission timing synchronization is achieved initially through a random access procedure. Uplink timing synchronization can then be maintained through timing advance commands sent by the eNB. In the case of COMP scenario 4 described above, to expand the capacity of random access channels, a TP-specific random access channel (TP-specific RACH) needs to be designed. The TP-specific RACH only provides random access service to UEs locally. Nonetheless, the RACH that provides cell-wide random access service to UEs is still required for coverage and also for backward compatibility with legacy UEs, and is referred to herein as the TP-common RACH. The present disclosure provides a design for both TP-common RACH and TP-specific RACH.

Handling of Power Control Command According to the TPC RNTIs

If a PC command is carried in Downlink Control Information (DCI) format 3/3A scrambled with legacy Transmit Power Control (TPC) Radio Network Temporary Identifiers (RNTIs)—that is, TPC-PUCCH-RNTI and TPC-PUSCH-RNTI, respectively, for the UL PC of PUCCH and PUSCH—then that PC command is used by the UE to update the $f_c(i)$ in the UL PC according to equation 1 above; on the other hand, if a PC command is carried in DCI format 3/3A scrambled with the new TPC RNTIs—denoted herein as TPC-EPUCCH-RNTI and TPC-EPUSCH-RNTI, respectively, for the UL PC of E-PUCCH and E-PUSCH—then that PC command is used by the UE to update the $f_c(i)$ in the UL PC according to equation 2 above.

In one alternative, the UE monitors DCI format 3/3A messages scrambled with legacy TPC RNTIs and the new TPC RNTIs simultaneously to facilitate dynamic switching of TP-common and TP-specific UL transmission. In another alternative, the UE is configured to monitor DCI 3/3A format messages with a plurality N of TPC-RNTIs, where a first subset of TPC-RNTIs are associated with the UL PC according to equation 1 above, and the second subset of TPC-RNTIs are associated with the UL PC according to equation 2 above. That is, if the UE receives a format 3/3A message scrambled with a TPC-RNTI from the first subset, the UE sets its transmission power using the UL PC according to equation 1, whereas if the UE receives a format 3/3A message scrambled with a TPC-RNTI from the second subset, the UE sets its transmission power using the UL PC according to equation 2.

In still another alternative, the UE is configured to monitor a plurality N of TPC values in DCI format 3/3A messages, with each TPC value representing a combination of a TPC-RNTI and a position index (command number) within that TPC-RNTI, and where a first subset of the TPC values are associated with the UL PC according to equation 1 and the second subset of the TPC values are associated with the UL PC according to equation 2. Thus, if the UE receives a TPC value from the first subset, the UE sets its transmission power using the UL PC according to equation 1, whereas if the UE receives a TPC value from the second subset, the UE sets its transmission power using the UL PC according to equation 2.

RACH and Procedure for Distributed Antenna Systems

According to the present disclosure, two types of random access channels (RACHs) are available for the UE, namely the TP-common RACH and the TP-specific RACH. The TP-common RACH provides the means for the UE to achieve uplink synchronization with the network assuming reception by multiple TPs, while the TP-specific RACH provides the means for the UE to achieve uplink synchronization with one or more targeted TP(s) (typically the closest/local TP(s)).

The TP-common RACH in systems according to the present disclosure serves the same purpose as the LTE Rel-8/9/10 RACH: The TP-common RACH enables a reliable cell-wide random access and can be used by the UE to achieve UL synchronization in scenarios including (but not limited to): initial cell access; recovery from radio link failure; handover; RRC IDLE to RRC CONNECTED transition; and transitions from the UL being unsynchronized to UL synchronization in RRC_CONNECTED state. The UE is configured to utilize the TP-common RACH by default, and the TP-common RACH is backward compatible so that the UE can operate in networks of previous LTE releases.

The TP-specific RACH can be used by the UE to achieve UL synchronization in scenarios including (but not limited to): Dormant to Active transition with a targeted TP in RRC_CONNECTED state; and RRC IDLE to RRC CONNECTED transition. Due to the local nature of the TP-specific RACH, transmission power by the UE is smaller on the TP-specific RACH compared to that on the TP-common RACH, so that some transmission power can be saved by the UE. In addition, the same TP-specific RACH resources can be configured for use by multiple TPs within the same cell, provided there is sufficient spatial separation between the TPs such that interference is below a certain threshold.

Figure 6:
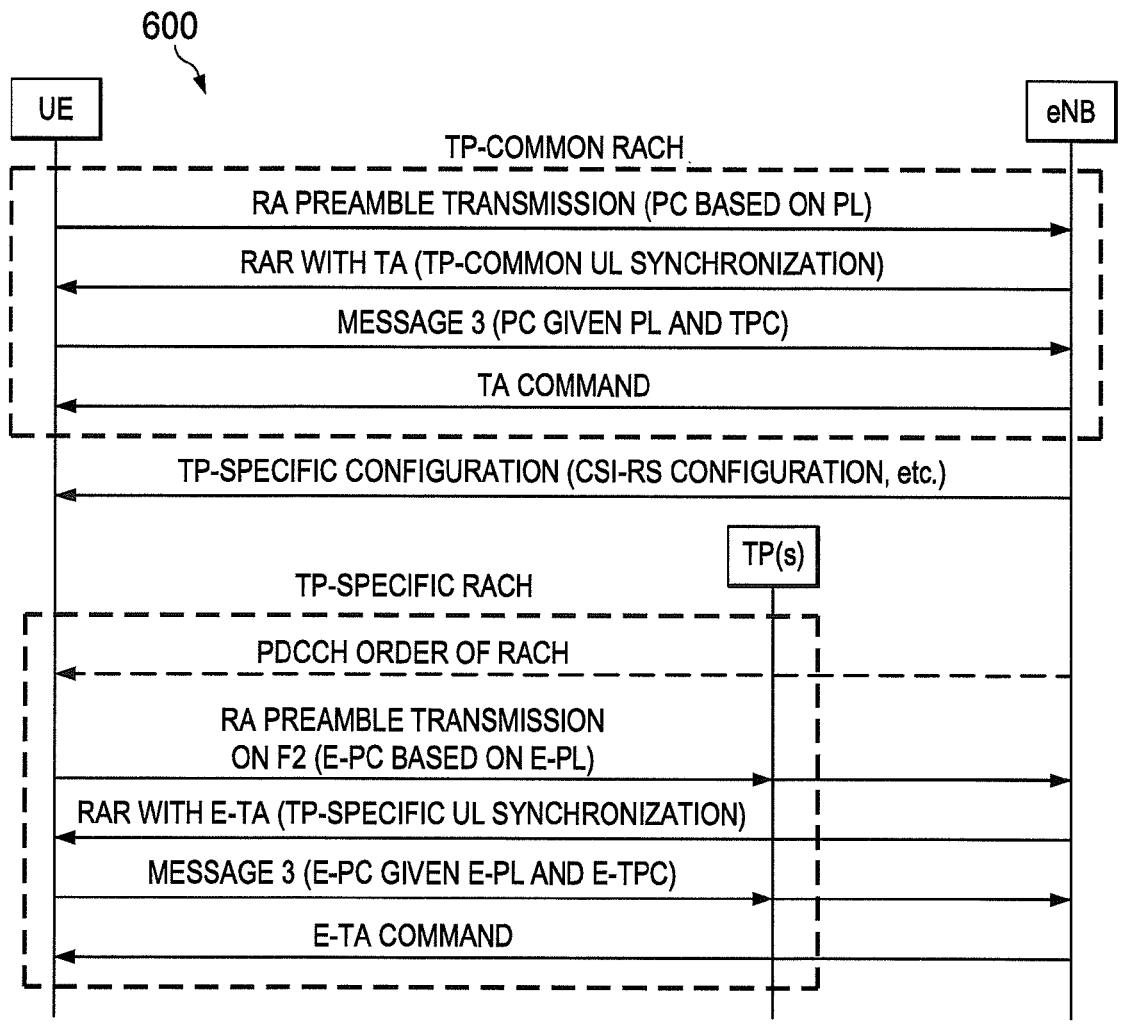
FIG. 6 is a diagram illustrating messages exchanged by a UE, an eNB, and a TP (e.g., an RRH) during transition by a UE from using the TP-common RACH to using a TP-specific RACH in a wireless network according to embodiments of the present disclosure.
Figure 8:
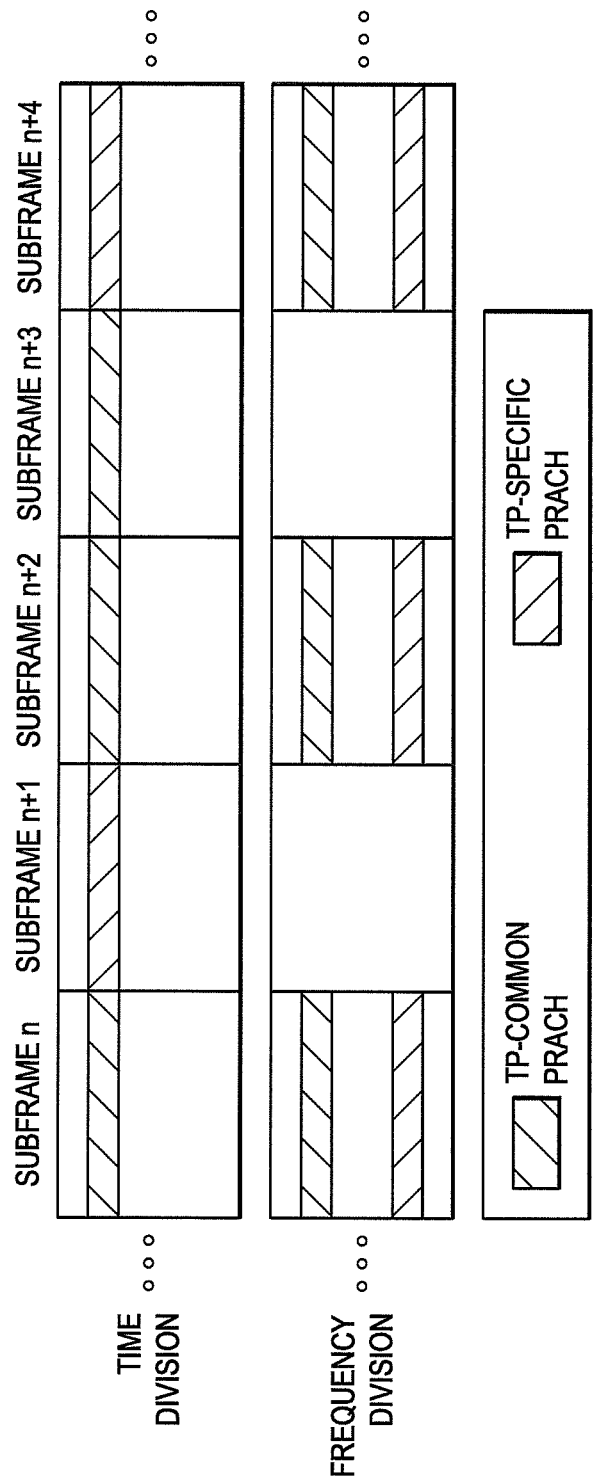
FIG. 8 illustrates time domain division and frequency domain division of PRACH resources for concurrent use of both the TP-common RACH and a TP-specific RACH in a wireless network according to embodiments of the present disclosure.

FIG. 6 is a diagram illustrating messages exchanged by a UE, an eNB, and a TP (e.g., an RRH) during transition by a UE from using the TP-common RACH to using a TP-specific RACH in a wireless network according to embodiments of the present disclosure. The message flow 600 includes a TP-common RACH portion starting with RA preamble transmission by the UE to the eNB with PC based on PL. The UE then receives an RAR with TA for TP-common synchronization from the eNB, and responds with any data message ("Message 3" if contention-based random access) using PC set based on the given PL and TPC, and receives back a TA command. At some subsequent point, the UE receives TP-specific configuration information from the eNB, with a CSI-RS measurement configuration, etc.

The next portion of message flow 600 is TP-specific, in response to a PDCCH order for RACH from the eNB to the UE. The TP-specific portion begins with RA preamble transmission by the UE to the (RRH) TP with E-PC based on E-PL, which is forwarded by the RRH to the eNB. The UE receives in response an RAR with E-TA from the eNB, for TP-specific UL synchronization. The UE responds to the RRH with any data message ("Message 3" if contention-based random access) using E-PC set based on the given E-PL and E-TPC, which is forwarded by the RRH to the eNB, and receives back from the eNB an E-TA command.

The TP-specific RACH is configured by the network, with TP-specific configurations by RRC (e.g., TP-specific CSI-RS configuration, or indication of one or more CSI-RS port index/indices used for TP-specific operation, as well as TP-specific RACH parameters). An example message flow diagram or messages sent and received during transitioning from use of the TP-common RACH to use of the TP-specific RACH is illustrated in FIG. 6. Once configured, the TP-specific RACH may be contention-based or non-contention based, and may be initiated by the network or initiated by the UE.

In one alternative, when the UE is configured with TP-specific configurations including allocation of a TP-specific RACH, use of the TP-common RACH can still be triggered (i.e., dynamic switching between the TP-specific RACH and the TP-common RACH is possible). The UE simultaneously maintains both the UL PCs according to equations 1 and 2 above for PUSCH transmission corresponding to the random access response grant (and also equations 3 and 4 set forth later), each of which can be updated, for example, depending on whether the PC command is received from PDCCH or E-PDCCH as previously described. Multiple TAs can also be maintained, i.e., one for TP-common UL transmissions and another for TP-specific UL transmissions. In such situations, different TA commands for TP-common UL transmission and TP-specific UL transmission are needed.

Alternatives for the condition for switching between use of the TP-specific RACH and the TP-common RACH include:
PDCCH order—If the PDCCH order is from the E-PDCCH, then use of the TP-specific RACH is triggered, while if the PDCCH order is from the PDCCH, then use of the TP-common RACH is triggered.
RAR grant—If the RAR grant is from the E-PDCCH, then a TP-specific PUSCH transmission corresponding to the RAR grant is performed, while if the RAR grant is from the E-PDCCH, then a TP-common PUSCH transmission corresponding to the RAR grant is performed.
Event-based switching—The type of RACH to be used depends on the triggering event so that, for example, the TP-common RACH is used for initial access or if the UE is trying to recover from radio link failure, or during handover, while otherwise the TP-specific RACH is used.

TP-Common RACH Power Control

For the TP-common RACH, the UE measures the path loss for power control purposes based on the RSRP measurement of the CRS as in LTE Rel-8/9/10:

Path loss=referenceSignalPower−higher layer filtered RSRP based on CRS where referenceSignalPower is the CRS Energy Per Resource Element (EPRE), signaled in System Information Block 2 (SIB2) as well as the RRC connection reconfiguration message including the mobility control information for handover purposes. The preamble transmission power PPRACH can be determined as in LTE Rel-8/9/10:

$$P_{PRACH}=\min\{P_{CMAX,c}(i),\text{PREAMBLE\_RECEIVED\_TARGET\_POWER}+PL_c\} \quad (3)$$

where $P_{CMAX,c}(i)$ is the configured UE transmit power for subframe i of the primary cell, $PL_c$ is the downlink path loss estimate calculated in the UE for the cell based on the CRS, and PREAMBLE_RECEIVED_TARGET_POWER is given by PREAMBLE_RECEIVED_TARGET_POWER=
preambleInitialReceivedTargetPower+
DELTA_PREAMBLE+(PREAMBLE_TRANSMISSION_COUNTER−1)*powerRampingStep The definitions of the parameters above can be found in [REF2]. The transmission power for Msg 3 can also be determined as in LTE Rel-8/9/10[4], given by equation 1 above with:

$P_{O\_PUSCH,c}(j)=P_{O\_NOMINAL\_PUSCH,c}(j)+P_{O\_UE\_PUSCH,c}(j)$
$P_{O\_UE\_PUSCH,c}(2)=0$
$P_{O\_NOMINAL\_PUSCH,c}(2)=P_{0\_PRE}+\Delta_{PREAMBLE\_Msg3}$
$P_{0\_PRE}=$preambleInitialReceivedTargetPower and $\Delta_{PREAMBLE\_Msg3}$ are both cell specific and signaled by a higher layer.

TP-Common RACH Resources Configuration

Resource configuration for the TP-common RACH is the same for cell-specific configuration as the RACH resource configuration is for LTE Rel-8/9/10, which are given by the Information Elements (IEs) PRACH-ConfigSIB, PRACH-Config, RACH-ConfigCommon and RACH-ConfigDedicated.

TP-Specific RACH

A UE is configured with a TP-specific RACH by higher layer signaling (e.g. when TP-specific configurations such as the TP-specific CSI-RS port(s) and the TP-specific RACH parameters are configured by RRC).

TP-Specific RACH Power Control

When configured with a TP-specific RACH, the UE measures the path loss for power control purpose based on the RSRP measurement of the local TP's CSI-RS:

Path loss=csi-referenceSignalPower−higher layer filtered RSRP based on CSI-RS (TP-specific)

where csi-referenceSignalPower is the CSI-RS EPRE of the local TP, signaled by the higher layer, e.g., along with the TP-specific CSI-RS configuration by RRC. The path loss estimated is the downlink path loss estimate for a local TP characterized by its CSI-RS configuration. The transmission power for the preamble and message 3 for TP-specific RACH can be determined by replacing PLC in equations (1) and (3)

above with E-PLc (also referred to above as $PL_{c,E}$), the Enhanced (local) path loss estimate, to obtain equation (2) above and:

$$P_{PRACH} = \min\{P_{CMAX,c}(i), \text{PREAMBLE\_RECEIVED\_TARGET\_POWER} + PL_{c,E}\}. \quad (4)$$

TP-Specific RACH Resources Configuration

A UE transmitting a preamble on the TP-common RACH may be using a much higher power compared to the power used by another UE transmitting a preamble on a TP-specific RACH. Therefore, random access contention between these two UEs generally favors the UE attempting to use the TP-common RACH, which implies that the RACH resources for TP-common RACH and TP-specific RACH should not collide (contention-based random access should only occur between UEs either both attempting to use the TP-common RACH or both attempting to use a TP-specific RACH, but not between a UE attempting to use the TP-common RACH and a US attempting to use a TP-specific RACH). In other words, the RACH resources for the TP-common RACH and each TP-specific RACH should be orthogonal.

Figure 7:
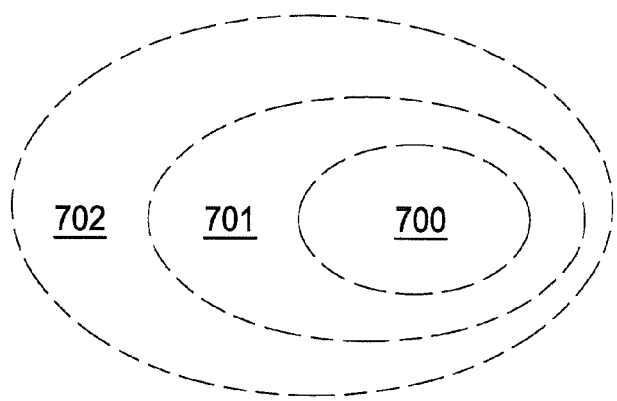
FIG. 7 illustrates RA preamble configuration for concurrent use of both the TP-common RACH and a TP-specific RACH in a wireless network according to embodiments of the present disclosure.

There are two methods to create orthogonal RACH resources for TP-common RACH and TP-specific RACH: In one method (Method RACH_RES-1), RA preambles available for a cell are organized as illustrated in FIG. 7. A set 700 of non-dedicated RA preambles are employed for use with the TP-specific RACH, a set 701 of dedicated RA preambles are employed for both the TP-common RACH and any TP-specific RACH, and a set 702 of non-dedicated RA preambles are employed for use with the TP-common RACH. The RRC signaling for the set 702 of non-dedicated RA preambles for TP-common RACH and the set 701 of dedicated RA preambles as interpreted by the legacy UEs are indicated by the same RRC signaling in LTE Rel-8/9/10 (given by IE numberOfRA-Preambles in SIB2 and in RRC connection reconfiguration message with mobility control information (handover)). For UEs supporting TP-specific RACH, the set 700 of dedicated RA preambles assumed by the legacy UEs is divided in to the set of non-dedicated RA preambles for TP-specific RACH and the set of dedicated RA preambles for TP-common/specific RACH, i.e.

{The set of Dedicated RA preambles (Rel-8/9/10)} = {The set of dedicated RA preambles for TP-common/specific RACH} + {The set of non-dedicated RA preambles for TP-specific RACH}

This new information for UEs supporting TP-specific RACH can also be provided by RRC signaling for TP-specific configuration. This method ensures that a UE performing TP-common RACH (which may be a legacy UE) and a UE performing TP-specific RACH will not contend with the same RA preamble.

Network initiation of TP-specific RACH can be signalled using PDCCH as in Rel-8/9/10 (PDCCH order for random access procedure) or using a new PDCCH designed for TP-specific operation.

In one method (Method RACH_RES-2), the time-frequency resources (PRACH resources) for TP-common RACH and TP-specific RACH are divided in time domain or frequency domain as illustrated in FIG. 7. TP-common PRACH resources are configured in the same way as in Rel-8/9/10 (i.e. via RRC, IE prach-ConfigIndex, prach-FreqOffset, in SIB2 and in RRC connection reconfiguration message with mobility control information (handover) [3]). TP-common PRACH resources are the only PRACH resources recognized by the legacy UEs. TP-specific PRACH resources is separately configured by RRC signaling in a similar way as the TP-common RACH and can only be recognized/used by UEs supporting TP-specific RACH. Method RACH_RES-2 allows the same RA preamble to be used for TP-common RACH and TP-specific RACH.

Network initiation of TP-specific RACH can be done using the new PDCCH for TP-specific operation (E-PDCCH) or using PDCCH as in Rel-8/9/10. In the former case, the random access procedures as in LTE Rel-10 can be reused from LTE Rel-8/9/10 on the new physical channel for control information. In the latter case, confusion of the target UE for the random access response (RAR) transmitted by the eNB may occur when the RA-RNTI and the RA preamble identifier monitored by a UE performing TP-specific RACH coincides with the RA-RNTI and the RA preamble identifier monitored by a UE performing TP-common RACH, although there is no real random access contention.

For LTE Rel-8/9/10, the RA-RNTI is computed as: RA-RNTI=1+t_id+10*f_id, where t_id is the index of the first subframe of the specified PRACH (0≤t_id<10), f_id is the index of the specified PRACH within that subframe, in ascending order of frequency domain (0≤f_id<6). To resolve the confusion of the target UE as described before, the value range for RA-RNTI for the TP-specific RACH can be augmented such that the RA-RNTI values derived from the PRACH resources used for TP-specific RACH do not overlap with the RA-RNTI values derived from the PRACH resources used for TP-common RACH. For example, denote t_idts and f_idts as the TP-specific t_id and f_id, respectively. One alternative is to define the TP-common RA-RNTI and TP-specific RA-RNTI as:

TP-common RA-RNTI=1+$t\_id$+10*$f\_id$; and

TP-specific RA-RNTI=1+$t\_idts$+10*$f\_idts$+X, where X is an offset for TP-specific RACH.
Alternatives for X are as follows:
  X is the maximum possible value for TP-common RA-RNTI. For example, X=60 for the Rel-8/9/10 RA-RNTI.
  X is a value configured by higher-layer signaling (e.g. RRC).
  X is a function of some "TP-specific id," which can be based on (for example) the CSI-RS configuration associated with the local TP.

TP-Specific RACH for RRC IDLE

In order to support TP-specific RACH for RRC IDLE to RRC CONNECTED transition, TP-specific RACH needs to be supported when the UE is in RRC IDLE state.

In one method (Method RACH_IDLE-1), TP-specific RACH for RRC IDLE is configured by the higher layer (e.g. via the RRC connection release message (RRCConnectionRelease)). The relevant RRC parameters for TP-specific RACH such as the TP-specific CSI-RS configuration and the TP-specific RACH parameters can be provided in the RRC connection release message.

The UE in RRC IDLE shall assume that the configured TP-specific RACH to be valid until a certain condition is satisfied, after which the UE shall release the TP-specific RACH configuration and fall back to TP-common RACH configuration.

In a first alternative, the UE in RRC IDLE shall assume that the TP-specific RACH configuration is valid until the RSRP value based on the TP-specific CSI-RS is below a certain threshold. The threshold can be predefined or configured by the higher layer (e.g. RRC).

In second alternative the UE in RRC IDLE shall assume that the TP-specific RACH configuration is valid until the RSRP value based on the TP-specific CSI-RS is worse than the RSRP value based on the CRS.

In third alternative, the UE in RRC IDLE shall assume that the TP-specific RACH configuration is valid until a certain time has lapsed. The duration can be predefined or configurable by the high layer (e.g. RRC).

The UE shall release the TP-specific RACH configuration upon reselection to a new cell.

In one method (Method RACH_IDLE-2), a group of TP-specific CSI-RS configurations and the necessary TP-specific RACH parameters is configured by the higher layer via the RRC connection release message (RRCConnectionRelease [2]). The group of TP-specific CSI-RS configurations represents a group of (nearby) TPs that the UE shall monitor during RRC IDLE.

The UE shall perform TP reselection procedure in a similar manner as the cell reselection procedure in Rel-8/9/10 [8] whereby the TPs can be ranked according to their RSRP values which are measured from the corresponding CSI-RS. In case none of the RSRP values measured from the CSI-RSs satisfies a minimum threshold (representing the minimum signal quality for connection) when a random access procedure is needed, the UE shall fall back to TP-common RACH configuration, otherwise the UE shall perform TP-specific RACH targeting the TP with the highest ranking. The UE shall release the TP-specific RACH configuration upon reselection to a new cell.

Figure 3C:
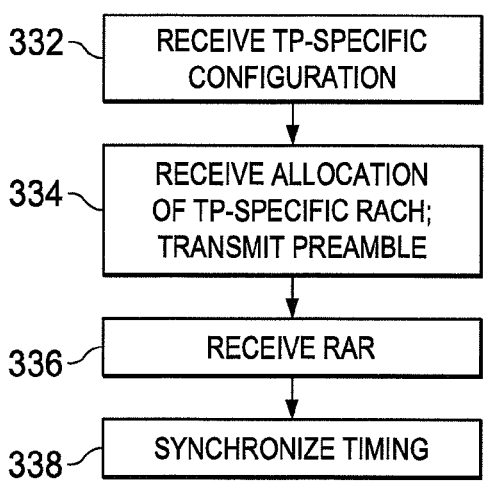
FIG. 3C is a high level flow chart for a process of switching to a TP-specific RACH when operating in the TP-specific transmission mode in a wireless network according to embodiments of the present disclosure.

FIG. 3C is a high level flow chart for a process of switching to a TP-specific RACH when operating in the TP-specific transmission mode in a wireless network according to embodiments of the present disclosure. The process 330 is executed within a UE that has switched to TP-specific transmission mode. The UE receives a TP-specific configuration (block 332), which as discussed above may be transmitted by an eNB and identifies a specific TP(s). In the example illustrated, the UE subsequently receives an allocation of a TP-specific RACH from the specific TP(s) (block 334). According to some embodiments of the present disclosure, the UE receives an allocation of a PDCCH over the TP-specific RACH (e.g., E-PDCCH) and, in response to the UE determining that the PDCCH was transmitted by the specific TP, the UE transmits over the TP-specific RACH but otherwise transmits over the common TP RACH. The UE transmits a random access preamble (RA preamble) to the specific TP(s) over the TP-specific RACH. The UE receives a random access response (RAR) over the TP-specific RACH (block 336), transmitted by the specific TP(s) in response to the RA preamble and preferably including TA information. According to some embodiments of the present disclosure, the UE determines if the RAR was transmitted by the specific TP(s) and transmits over the TP-specific RACH if the RAR was transmitted by the specific TP(s) but otherwise transmits over the TP-common RACH. In response to receiving TA information over the TP-specific RACH, the UE synchronizes timing on the TP-specific RACH with the specific TP (block 338). As noted above, the UE preferably utilizes the TP-common RACH primarily for initial access or if the UE is trying to recover from radio link failure, or during a handover, and otherwise utilizes the TP-specific RACH.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A method of switching by a user equipment (UE) from a transmission point common (TP-common) mode to a transmission point specific (TP-specific) mode in a wireless network, comprising:

receiving, by the UE, a plurality of channel state information reference signals (CSI-RSs) each associated with a respective transmit point (TP);

measuring, by the UE, respective reference signal received power (RSRP) of the CSI-RS s;

transmitting, by the UE, a measurement report including the measured RSRPs;

receiving, by the UE, a TP-specific configuration, wherein the TP-specific configuration identifies a specific TP; and switching, by the UE, from the TP-common mode to the TP-specific mode in response to the TP-specific configuration by establishing connectivity with the identified specific TP.

2. The method of claim 1, further comprising transmitting, by the UE, in the TP-common mode prior to switching to the TP-specific mode.

3. The method of claim 1, further comprising:
receiving, by the UE, a timing advance (TA) signal from the identified specific TP; and
synchronizing timing by the UE with the identified specific TP using the TA signal.

4. The method of claim 1, further comprising:
receiving, by the UE, a TP-specific power control signal from the identified specific TP; and
adjusting the UE's transmit power level based on the TP-specific power control signal.

5. The method of claim 1, further comprising:
receiving, by the UE, a TP-specific power control signal from the identified specific TP; and
switching, by the UE, a transmit power level from a TP-common power level to a TP-specific power level in response to the TP-specific power control signal.

6. The method of claim 1, further comprising:
receiving, by the UE, an allocation of a data channel and a control channel from the identified specific TP; and
transmitting, by the UE, in the TP-specific mode over the allocated data channel and the control channel.

7. The method of claim 1, wherein the specific TP mode configuration is determined based on the measured RSRPs.

8. The method of claim 1, wherein the UE receives the CSI-RSs from the TPs.

9. The method of claim 1, wherein in the TP-common mode uplink signals transmitted by the UE are received by a plurality of TPs.

10. The method of claim 1, wherein in the TP-specific mode uplink signals transmitted by the UE are received by the identified specific TP.

11. A method of uplink power control in a wireless network, comprising:
transmitting, by a user equipment (UE), at a transmit point common (TP-common) power level;
receiving, by the UE, a plurality of channel state information reference signals (CSI-RSs) each associated with a specific transmit point (TP);
measuring, by the UE, respective reference signal received power (RSRP) of the CSI-RSs;
transmitting, by the UE, a measurement report in response to the measured RSRPs;
receiving, by the UE, TP-specific configuration, wherein the TP-specific configuration identifies a specific TP;
establishing, by the UE, UE uplink connectivity with the identified specific TP;
receiving, by the UE, a TP-specific power control signal including a TP-specific power level from the identified specific TP; and adjusting, by the UE, a transmit power level from the TP-common power level to the TP-specific power level responsive to the TP-specific power level.

12. The method of claim 11, wherein the TP-common power level is higher than the TP-specific power level.

13. The method of claim 11, further comprising:
transmitting at a relatively high power level by the UE in a transmit point common (TP-common) mode to compensate for a larger path loss between the UE and the TPs; and
transmitting at a relatively low power level by the UE in a transmit point specific (TP-specific) mode due to a smaller path loss between the UE and the identified specific TP.

14. The method of claim 11, further comprising:
receiving, by the UE, a timing advance (TA) signal from the identified specific TP; and
synchronizing timing by the UE with the identified specific TP responsive to the TA signal.

15. The method of claim 11, wherein the TP-specific configuration is determined based on the measured RSRPs.

16. The method of claim 11, wherein the TP-specific power level is determined from the measured RSRPs.

17. The method of claim 11, wherein the UE receives the CSI-RSs from the identified specific TP.

18. The method of claim 11, wherein in the TP-common mode uplink signals transmitted by the UE are received by a plurality of TPs.

19. The method of claim 11, wherein in the TP-specific mode uplink signals transmitted by the UE are received by the identified specific TP.

20. A method of uplink power control in a wireless network, comprising:
transmitting at a high power level by a user equipment (UE) in a transmit point common (TP-common) mode to compensate for a larger path loss between the UE and the TPs; and
transmitting at a low power level by the UE in a transmit point specific (TP-specific) mode to save battery power due to a smaller path loss between the UE and a specific TP.

21. The method of claim 20, further comprising:
receiving, by the UE, a plurality of channel state information reference signals (CSI-RSs) each associated with a respective specific transmit point (TP);
measuring, by the UE, respective reference signal received power (RSRP) of the CSI-RSs; and
transmitting, by the UE, a measurement report in response to the measured RSRPs.

22. The method of claim 21, further comprising:
receiving, by the UE, TP-specific configuration, wherein the TP-specific configuration identifies a specific TP;
establishing, by the UE, uplink connectivity with the identified specific TP;
receiving, by the UE, a TP-specific power control signal from the identified specific TP; and
adjusting, by the UE, the transmit power level from the high power level to the low power level responsive to the TP-specific power control signal.

23. A system for switching from a transmission point common (TP-common) mode to a transmission point specific (TP-specific) mode in a wireless network, comprising:
a receiver configured to receive a plurality of channel state information reference signals (CSI-RSs) each associated with a respective transmit point (TP) and operable to measure respective reference signal received power (RSRP) of the CSI-RSs, the receiver configured to receive a TP-specific configuration, wherein the TP-specific configuration identifies a specific TP; and
a transmitter configured to transmit a measurement report including the measured RSRPs,
wherein the system switches from the TP-common mode to the TP-specific mode in response to the TP-specific configuration by establishing uplink connectivity with the identified specific TP.

24. The system of claim 23, wherein the receiver is configured to receive a timing advance (TA) signal from the identified specific TP, and wherein the UE synchronizes timing with the identified specific TP using the TA signal.

25. The system of claim 23, wherein the receiver is configured to receive a TP-specific power control signal from the identified specific TP, and wherein the UE's transmit power level is adjusted based on the TP-specific power control signal.

26. The system of claim 23, wherein the receiver is configured to receive an allocation of a data channel and a control channel from the identified specific TP.

27. The system of claim 23, wherein the transmitter is operable to transmit in the TP-specific mode over the allocated data channel and the control channel.

28. The system of claim 23, wherein the specific TP mode configuration is determined based on the measured RSRPs.

29. The system of claim 23, wherein in the TP-common mode uplink signals are received by a plurality of TPs.

30. The system of claim 23, wherein in the TP-specific mode uplink signals are received by the identified specific TP.

* * * * *